US008806732B2

(12) United States Patent
Ward et al.

(10) Patent No.: US 8,806,732 B2
(45) Date of Patent: Aug. 19, 2014

(54) METHOD FOR PROTECTING A CONNECTION INTERFACE IN A COMPUTER-DOCKING ASSEMBLY

(75) Inventors: Hoss Ward, San Francisco, CA (US); Nick Merz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 974 days.

(21) Appl. No.: 12/884,962

(22) Filed: Sep. 17, 2010

(65) Prior Publication Data

US 2011/0000071 A1 Jan. 6, 2011

Related U.S. Application Data

(63) Continuation of application No. 11/650,395, filed on Jan. 5, 2007, now Pat. No. 7,810,222.

(51) Int. Cl.

| | |
|---|---|
| ***B21D 53/52*** | (2006.01) |
| ***B21F 45/18*** | (2006.01) |
| ***B29D 5/00*** | (2006.01) |
| ***H01R 35/02*** | (2006.01) |

(52) U.S. Cl.

CPC ............ *H01R 35/02* (2013.01); *H01R 2201/06* (2013.01)

USPC .................................. 29/410; 29/482; 29/445

(58) Field of Classification Search

USPC ............... 29/410, 428, 445, 854; 361/679.11, 361/679.27, 679.41, 679.45, 679.57; 710/303, 304

See application file for complete search history.

(56) References Cited

U.S. PATENT DOCUMENTS

| | | | | |
|---|---|---|---|---|
| 6,382,577 | B1 | 5/2002 | McCoy et al. | |
| 6,788,527 | B2 | 9/2004 | Doczy et al. | |
| 6,856,506 | B2 | 2/2005 | Doherty et al. | |
| 7,023,692 | B2 | 4/2006 | Mansutti et al. | |
| 7,142,421 | B2 | 11/2006 | Cheng et al. | |
| 7,492,579 | B2 * | 2/2009 | Homer et al. ............ | 361/679.41 |
| 2005/0213298 | A1 | 9/2005 | Doherty et al. | |

FOREIGN PATENT DOCUMENTS

| | | |
|---|---|---|
| JP | 2005-0213298 | 9/2005 |

* cited by examiner

*Primary Examiner* — Thiem Phan

(74) *Attorney, Agent, or Firm* — Morris & Kamlay LLP

(57) ABSTRACT

A method for protecting a connection interface in a computer-docking assembly in which a computer-support assembly is partially rotated about an arm assembly while moving the computer-support assembly toward a connection interface of the base station. The computer-support assembly is generally aligned with the connection interface of the base station to posture the computer-support assembly in proximity to the interface connection of the base station for protecting the interface connection.

5 Claims, 11 Drawing Sheets

METHOD FOR PROTECTING A CONNECTION INTERFACE IN A COMPUTER-DOCKING ASSEMBLY

CROSS REFERENCE TO RELATED APPLICATIONS

This is a continuation application of U.S. Ser. No. 11/650,395, filed Jan. 5, 2007, now allowed, the contents of which are hereby incorporated by reference into this application.

FIELD OF THE INVENTION

Embodiments of the present invention relate to a method for protecting a connection interface. More specifically, embodiments of the present invention provide a method for protecting a connection interface in a computer-docking assembly. Embodiments of the present invention also provide a method for engaging a portable computer.

BACKGROUND OF THE INVENTION

A docking station typically contains slots for expansion cards, bays for storage devices, and connectors for peripheral devices, such as printers and monitors. A docking station can also include a network interface card (NIC) that attaches the notebook to a local area network (LAN). Once inserted in a docking station, a portable computer essentially becomes a desktop model computer. When it is taken out, it becomes a portable computer again. Most importantly, the same data is accessible in both modes because it resides on the portable computer's drives.

The idea behind docking stations is to let one simultaneously enjoy the expansion possibilities of desktop model computers with the portability of portable computers (e.g. small handheld computers). In addition, the docking station enables one to use a full-size keyboard and monitor when one is not traveling. However, a number of cables are needed for coupling a portable computer to a docking station. These cables are sometimes cumbersome, and can make interconnecting the portable computer to the docking station awkward, not to mention needing the additional space to make the interconnection. Also, a docketing station has a connection-interface which can be damaged if not protected.

Therefore, what is needed is an improved method for engaging (e.g., a keyboard) a portable computer while not occupying the additional space needed by a conventional interconnection of a portable computer to a docking station. What is further needed and what has been invented is an efficient, cost-effective and improved method for protecting a connection interface in a computer-docking assembly.

SUMMARY OF EMBODIMENTS OF THE INVENTION

Embodiments of the present invention provide a method for protecting a connection interface in a computer-docking assembly. The method for protecting comprises rotating at least partially a computer-support assembly about an arm assembly while moving the computer-support assembly toward a connection interface of the base station and while the arm assembly is at least partially rotating about the base station. The method for protecting additionally comprises aligning generally the computer-support assembly with the connection interface of the base station to posture the computer-support assembly in proximity to the interface connection of the base station for protecting the interface connection.

Embodiments of the present invention further provide an improved method for engaging or contacting a portable computer. The method for engaging comprises moving away from a base station at least one engager member bound to a computer-support assembly. The base station and the computer-support assembly are rotatably coupled to an arm assembly. The method for engaging additionally includes moving the computer-support assembly away from the base station while rotating about the arm assembly, and positioning the computer-support assembly in a posture for receiving a portable computer (e.g., a small handheld computer). The method for engaging further additionally includes disposing a portable computer in the computer-support assembly, and contacting at least one surface (e.g., the keyboard and/or the back) of the portable computer.

These provisions, together with the various ancillary provisions and features which will become apparent to those skilled in the art as the following description proceeds, are attained by the methods and assemblies of the present invention.

DETAILED DESCRIPTION OF EMBODIMENTS OF THE INVENTION

In the description herein, numerous specific details are provided, such as examples of components and/or methods, to provide a thorough understanding of the embodiments of the present invention. One skilled in the relevant art will recognize, however, that an embodiment of the invention may be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
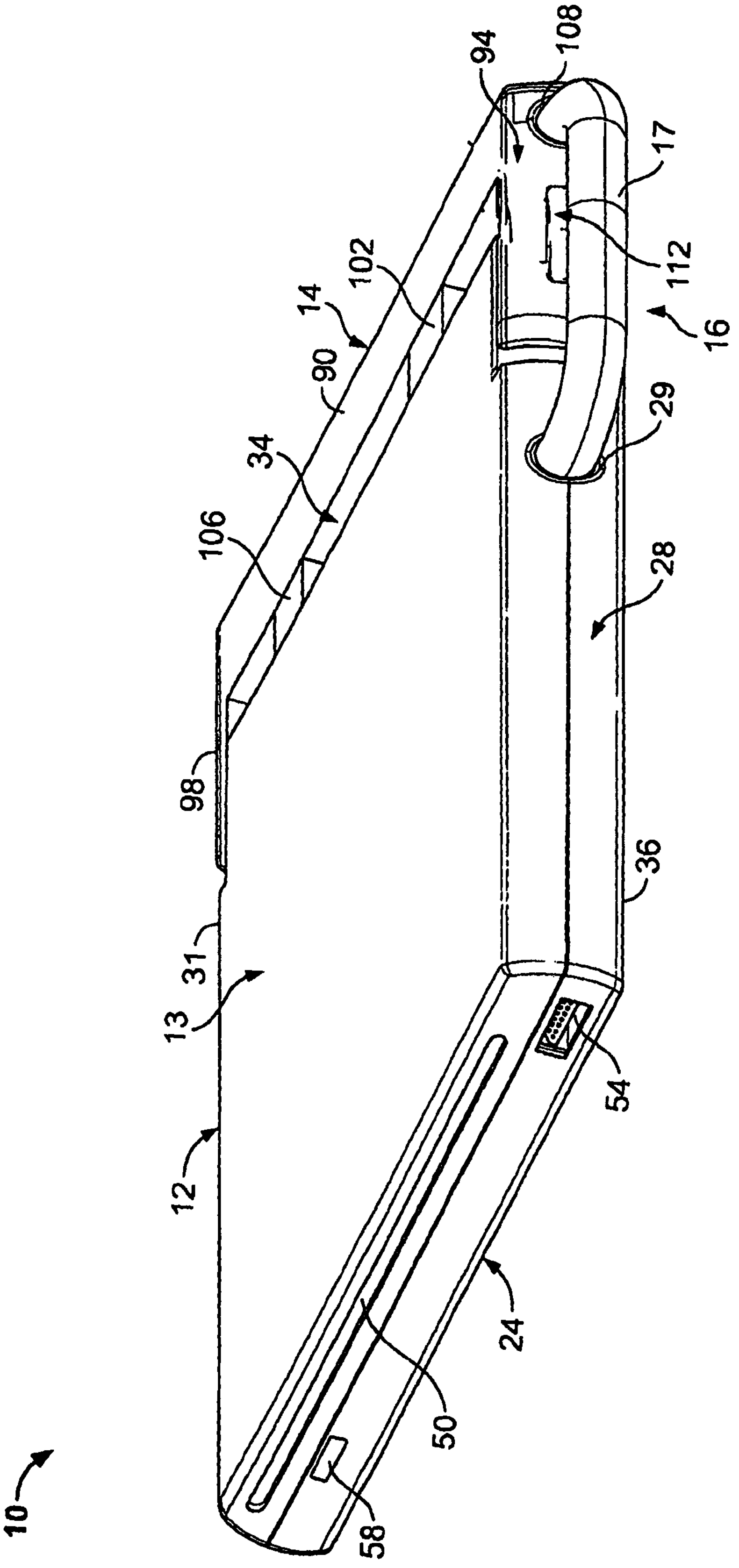
FIG. 1 is a perspective view of an embodiment of the docking assembly in a closed position and illustrating a docking or base station and a computer support assembly pivotally secured thereto.

Referring in detail now to the drawings wherein similar parts of embodiments of the invention are identified by like reference numerals, there is seen in FIG. 1 a perspective view of an embodiment of the docking assembly, generally illustrated as 10. The docking assembly 10 includes a docking or base station, generally illustrated as 12. Pivotally secured or coupled to the docking station 12 via an arm assembly 16 is a computer support assembly, generally illustrated as 14. The arm assembly 16 includes an arm 17 rotatably coupled to the docking station 12 and the computer support assembly 14 at locations 29 and 108, respectively. The rotatable coupling among the arm assembly 16, the docking station 12, and the computer support assembly 14 may be in suitable fashion or manner. For example, the computer support assembly 14 may rotate on or about the arm assembly 16, while the arm assembly 16 may rotate on or about the docking station 12.

The docking station 12 illustrated in FIG. 1 includes a top 13, a bottom 36, as well as side interfaces 24 and 34, all respectively secured to arm-assembly side 28 and side 31. For various embodiments of the invention, side interface 24 may include any suitable components, such as elect button 58, a CD/DVD slot 50, and USB port 54. As further seen in FIG. 1, the computer support assembly 14 includes a support member 90 having connected or coupled thereto, preferably in an integral manner, a pair of engagers 94 and 98, which may be flexible or non-flexible. The engagers 94 and 98 connect or couple to the support member 90 in a generally opposed relationship. Engager 94 has an opening 112. Secured to the base 90 is a pair of connectors, multipurpose connector 102 and HDMI connector 106. The arm assembly 16 is illustrated as having the arm 17 rotatably coupled to the docking station 12 and the computer support assembly 14 at locations 29 and 108, respectively.

Figure 2:
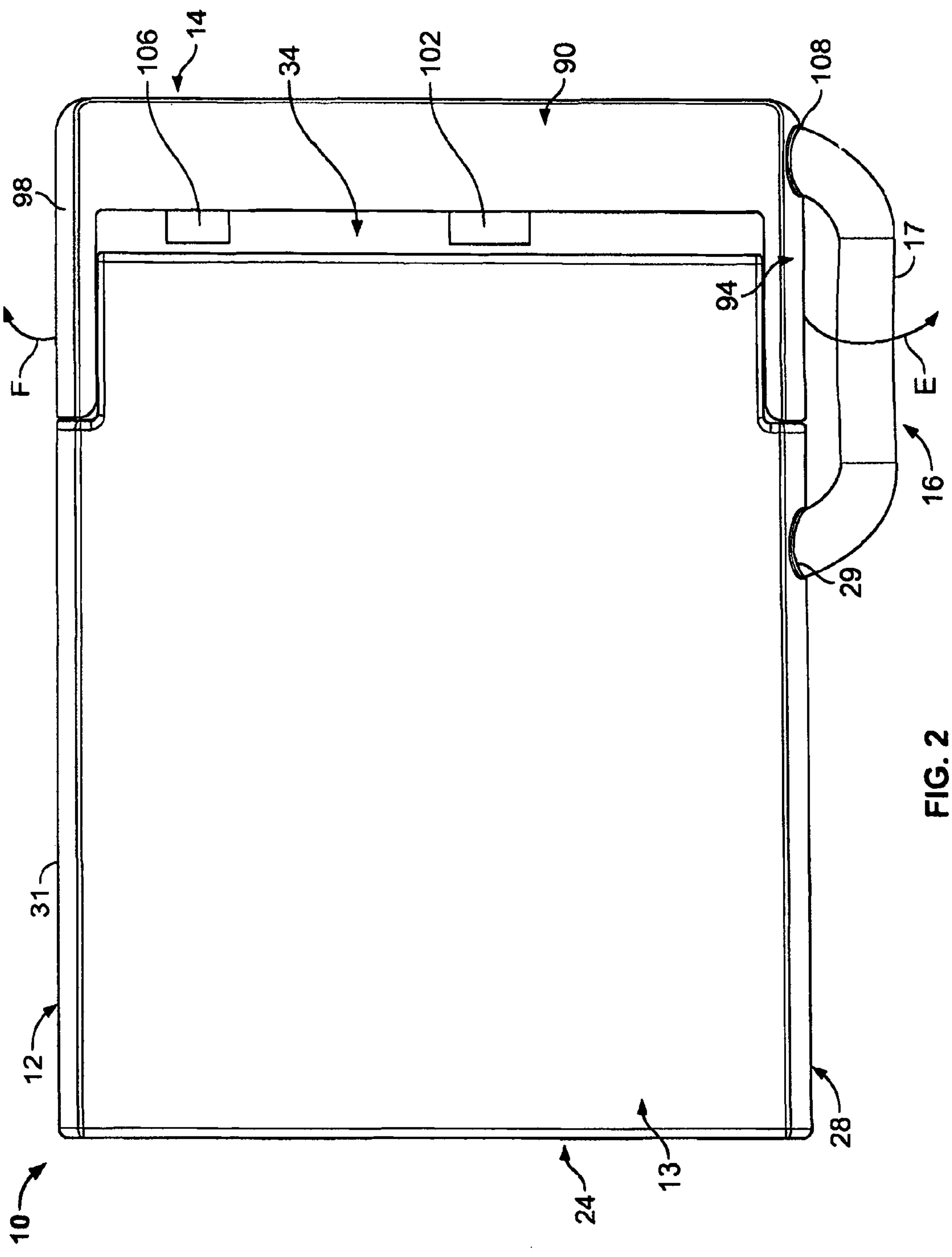
FIG. 2 is a top plan view of the docking assembly of FIG. 1.

FIG. 2 is a top plan view of the docking station 12 with the computer support assembly 14 pivotally secured thereto. There is seen in FIG. 2 the docking assembly 10, top 13 of the docking station 12, and side 31 and side interfaces 24 and 34 of the docking station 12. Also seen is the support member 90 having connected or coupled thereto the pair of engagers 94 and 98. In an embodiment of the invention, the engagers 94 and 98 may respectively flex outwardly in direction of arrows E and F. The multipurpose connector 102 and HDMI connector 106 are shown as connected to the base 90. The arm assembly 16 is illustrated as having the arm 17 rotatably coupled to the docking station 12 and the computer support assembly 14 at locations 29 and 108, respectively. In an embodiment of the invention, the docking assembly 10 may include another arm assembly rotatably coupled to the docking station 12 and to the computer support assembly 14.

Figure 3:
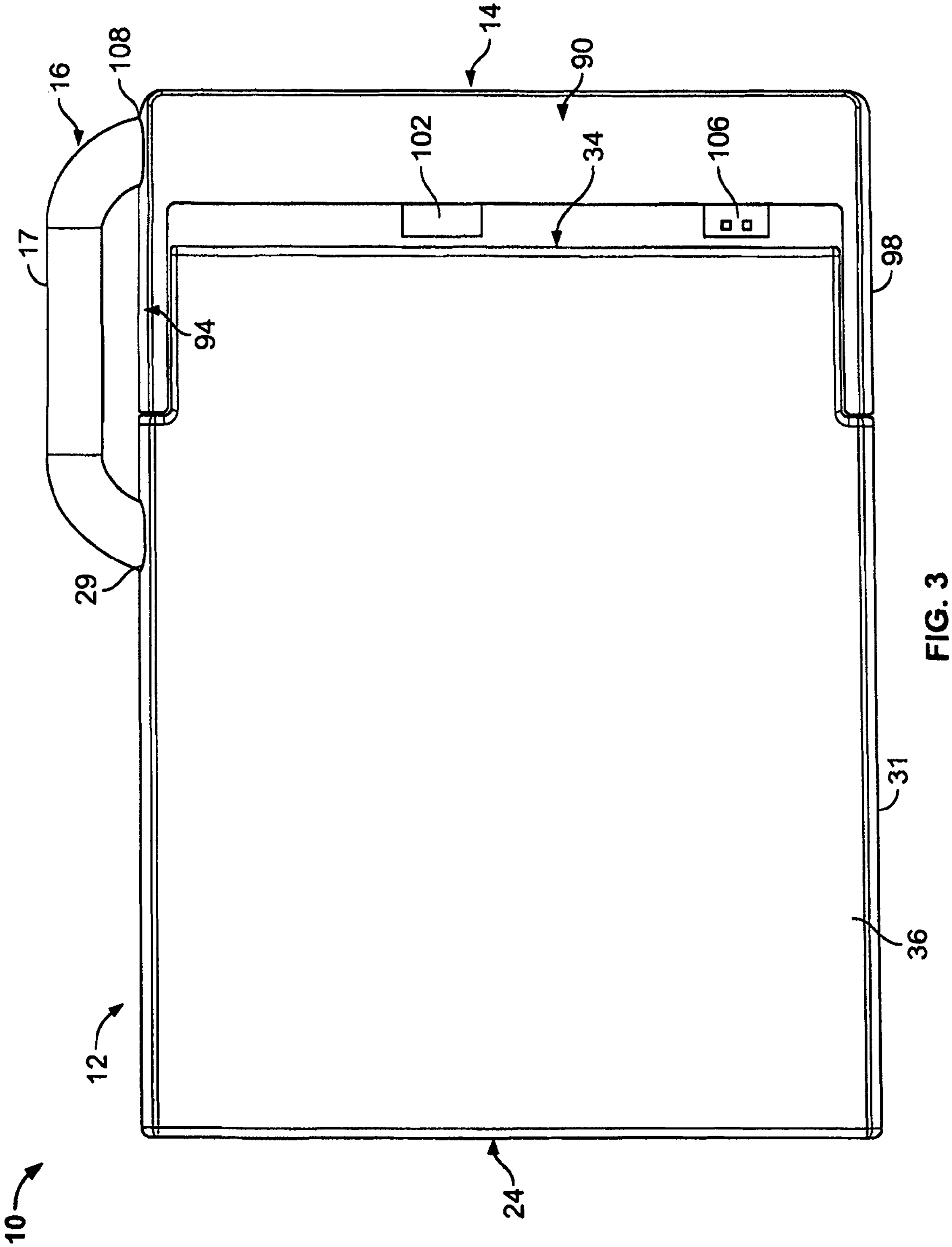
FIG. 3 is a bottom plan view of the docking assembly of FIG. 1.

FIG. 3 is a bottom plan view of the docking station 12 having the computer support assembly 14 pivotally secured or coupled thereto. There is seen in FIG. 3 the docking assembly 10, the bottom 36 of the docking station 12, and side 31 and side interfaces 24 and 34 of the docking station 12. Also seen in FIG. 3 is the support member 90 having connected or coupled thereto the pair of engagers 94 and 98. The multipurpose connector 102 and HDMI connector 106 are seen as connected to the base 90. The arm assembly 16 is seen as having the arm 17 rotatably coupled to the docking station 12 and the computer support assembly 14 at locations 29 and 108, respectively.

Figure 4:
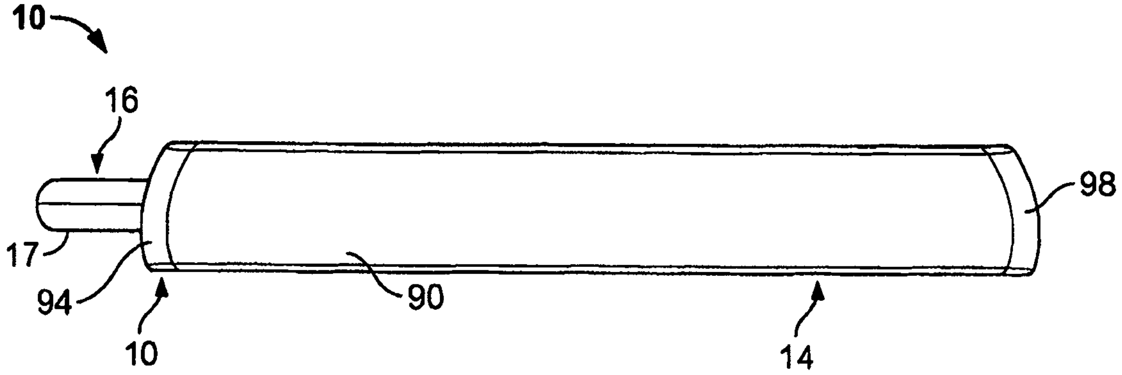
FIG. 4 is a side elevational view of the docking assembly of FIG. 1.

FIG. 4 is a side elevational view of the docking assembly 10 having the computer support assembly 14 in a closed position and pivotally secured or coupled to the docking station. The arm assembly 16 is shown as having the arm 17. The support member 90 of the computer support assembly 14 is also shown along with the pair of engagers 94 and 98.

Figure 5:
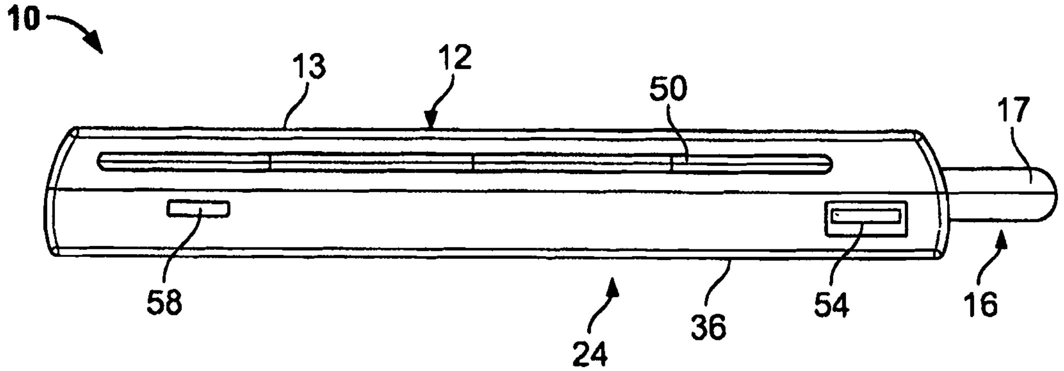
FIG. 5 is another side elevational view of the docking assembly of FIG. 1.

FIG. 5 is another side elevational view of the docking assembly 10 having the computer support assembly in a closed position and pivotally secured or coupled to the docking station 12. The top 13 and bottom 36 of the docking station 12 is illustrated, along with the arm assembly 16 having the arm 17. Side interface 24 of the docking station 12 is seen having the elect button 58, a CD/DVD slot 50, and USB port 54.

Figure 6:
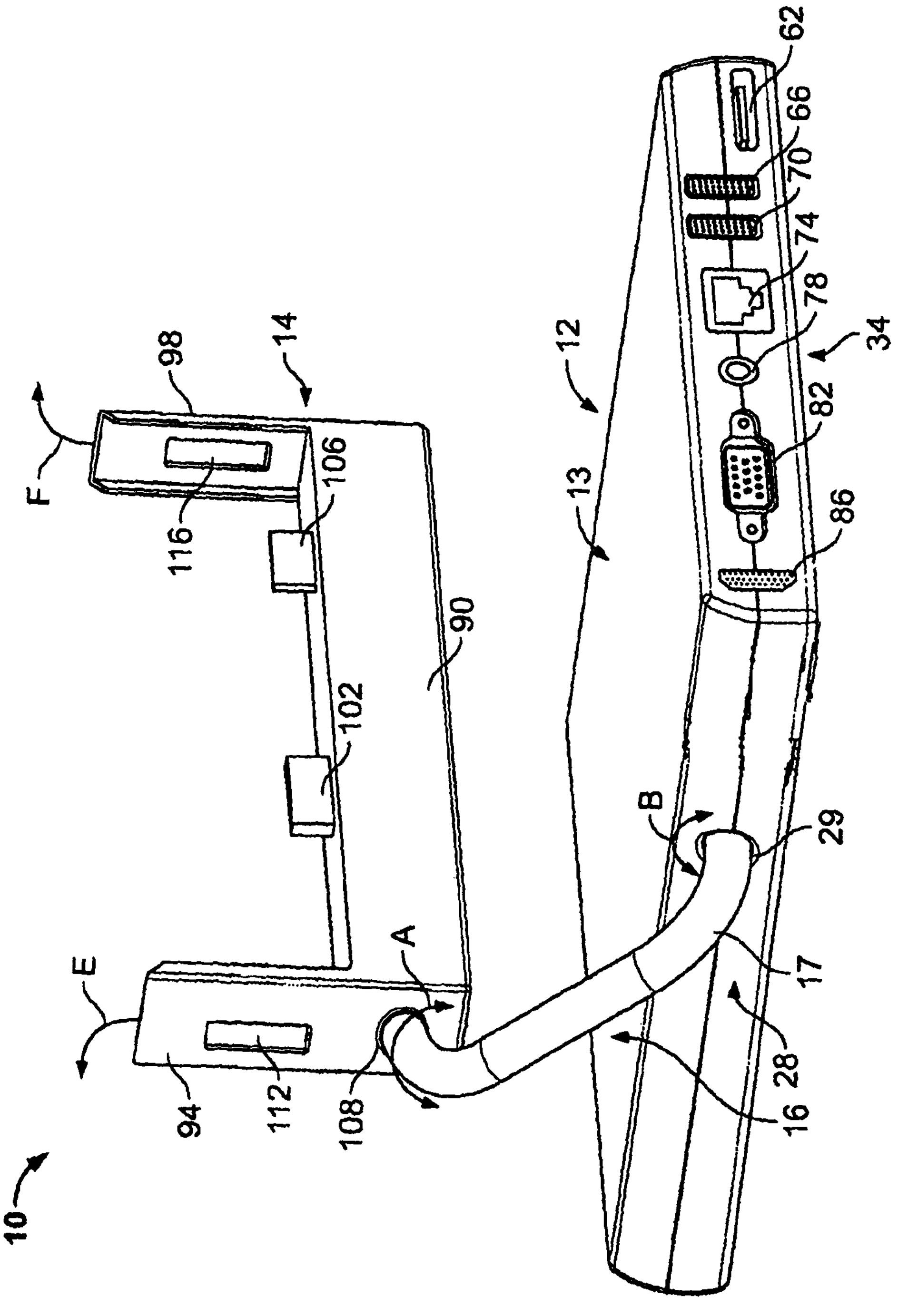
FIG. 6 is a perspective view of an embodiment of the docking assembly in an open position and illustrating the docking station and the computer support assembly in position for receiving and supporting a small handheld computer.

FIG. 6 is a perspective view of an embodiment of the docking assembly 10 including the docking station 12 with the computer support assembly 14 having been pivoted into a position for receiving and supporting a small handheld computer. For various embodiments of the invention, the side interface 34 may include any suitable connectors or ports. By way of example only and as shown in FIG. 6, the side interface 34 may comprise a power connector 62, a USB connection 66, a USB connector 70, Ethernet Port 74, an audio port connector 78, a UGA 82 and an IEEE HDMI 86. The arm-assembly side 28 is illustrated. The top 13 and bottom 36 of the docking station 12 is illustrated, along with the arm assembly 16 having the arm 17 rotatably coupled to the docking station 12 and the computer support assembly 14 at locations 29 and 108, respectively.

The computer support assembly 14 is shown in FIG. 6 as having the support member 90 with the pair of engagers 94 and 98 connected or coupled thereto in a generally opposed relationship. Engager 94 has opening 112. Engager 98 has opening 112. Further seen in FIG. 6 is the base 90 supporting the pair of connectors, multipurpose connector (e.g., docking and power) 102 and HDMI connector 106. Engagers 94 and 98 are capable of flexing outwardly in direction of arrows E and F, respectively.

In an embodiment, the arm 17 of the arm assembly 16 may be a generally hollow conduit. Wires (not shown) may pass through the arm 17 for electrically interconnecting appropriate components (e.g., RAM, hard disk drive, and battery) with the multipurpose connector 102 and HDMI connector 106. In another embodiment of the invention, there may be a wireless communication between the appropriate components and the multipurpose connector 102 and HDMI connector 106 supported by base 90.

The computer support assembly 14 may be adjusted into a desired position by rotating the same about the arm assembly 16 in direction of arrow A and/or rotating the arm assembly 16 about the computing support assembly 14 in direction of the arrow B, as best shown in FIG. 6. As indicated, when the computer support assembly 14 is in a desired position, preferably when the multipurpose connector 102 and HDMI connector 106 are generally normal with respect to the base 90 as best shown in FIG. 6, a portable computer (e.g., a small handheld computer) may be conveniently positioned to engage the multipurpose connector 102 and HDMI connector 106, as previously indicated.

Figure 7:
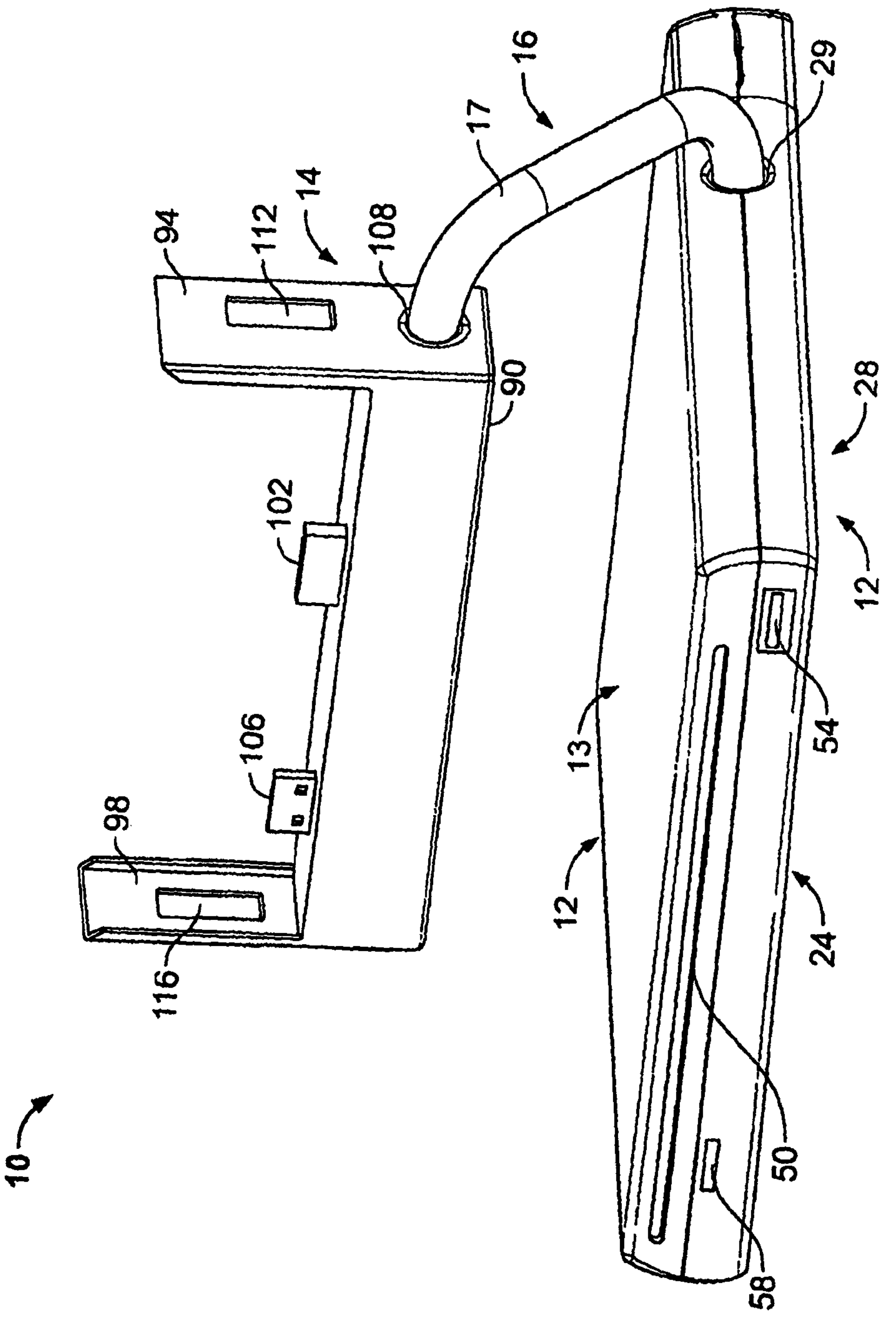
FIG. 7 is another perspective view of the docking assembly of FIG. 6 and illustrating the docking station with the computer support assembly in a position for receiving and supporting a small handheld computer.

FIG. 7 is yet another perspective view of an embodiment of the docking assembly 10 including the docking station 12 and the computer support assembly 14 having been pivoted into a position for receiving and supporting a small handheld computer. The side interface 24 is illustrated as having the elect button 58, the CD/DVD slot 50, and USB port 54. The arm-assembly side 28 is illustrated in FIG. 7. The top 13 of the docking station 12 is illustrated, along with the arm assembly 16 having the arm 17 rotatably coupled to the docking station 12 and the computer support assembly 14 at locations 29 and 108, respectively.

The computer support assembly 14 is shown in FIG. 7 as including the support member 90 having the pair of engagers 94 and 98 connected or coupled thereto. The engagers 94 and 98 connect to the support member 90 in a generally opposed relationship. Engager 94 has opening 112. Engager 98 has opening 116. Further seen in FIG. 6 is the base 90 supporting the pair of connectors, multipurpose connector 102 and HDMI connector 106.

Figure 8:
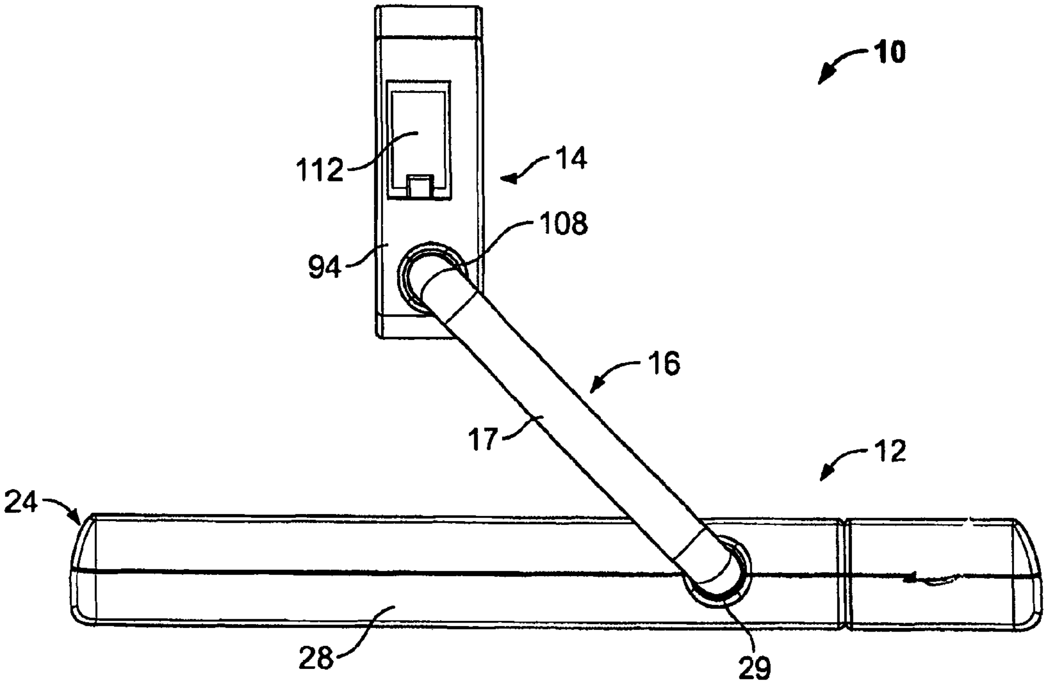
FIG. 8 is a side elevational view of the docking assembly of FIG. 6.

FIG. 8 is a side elevational view of the docking assembly 10 of FIG. 6. There is seen in FIG. 8 the side interface 24 of the docking station 12, along with the arm assembly 16 and its associated arm 16 pivoting to the docking station 12 at location 29 which is located in side 28. A side elevational view of the computer support assembly 14 is shown as including the engager 94 having opening 112. The arm assembly 16 is shown as pivotally coupling to the computer support assembly 14 at location 108.

Figure 9:
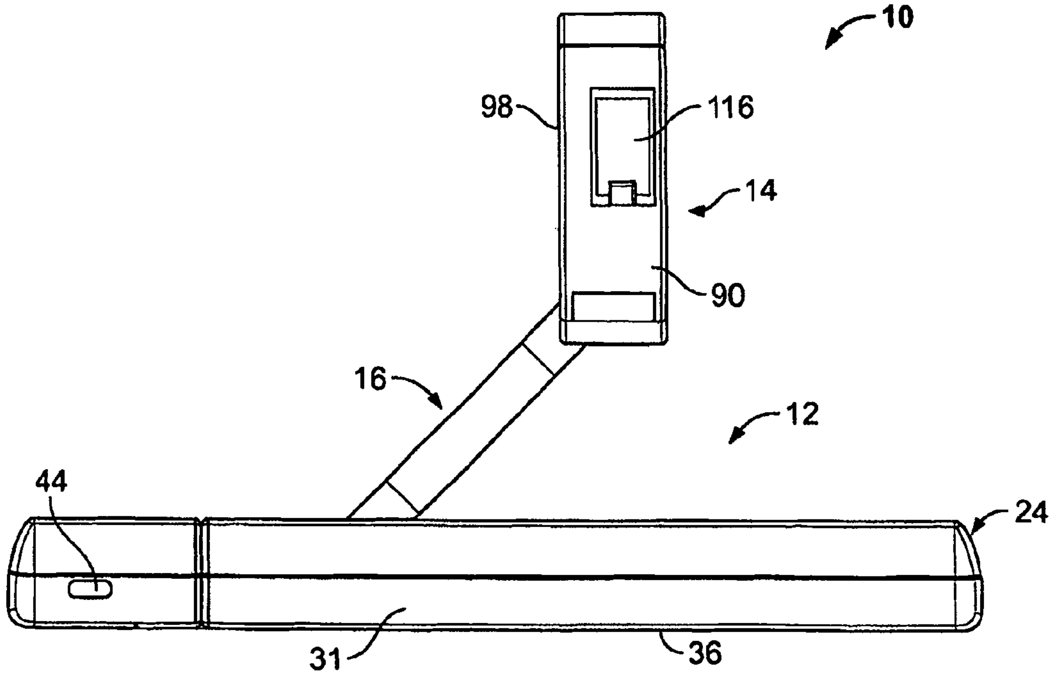
FIG. 9 is a side elevational view of the docking assembly of FIG. 6, opposite the side of the embodiment of the docking assembly shown in FIG. 8.

FIG. 9 is a side elevational view of the docking assembly 10 of FIG. 6, opposite the side of the embodiment of the docking assembly 10 shown in FIG. 8. There is seen in FIG. 9 the side interface 24 of the docking station 12, along with the arm assembly 16. The docking station 12 is illustrated as having the bottom 36, and the side 31 having the kengsingtor lock hole 44. A side elevational view of the computer support assembly 14 is shown as including the engager 98 coupled, preferably integrally coupled, to the base 90. Engager 98 is shown as having opening 116. The arm assembly 16 is also shown in FIG. 9.

Figure 10:
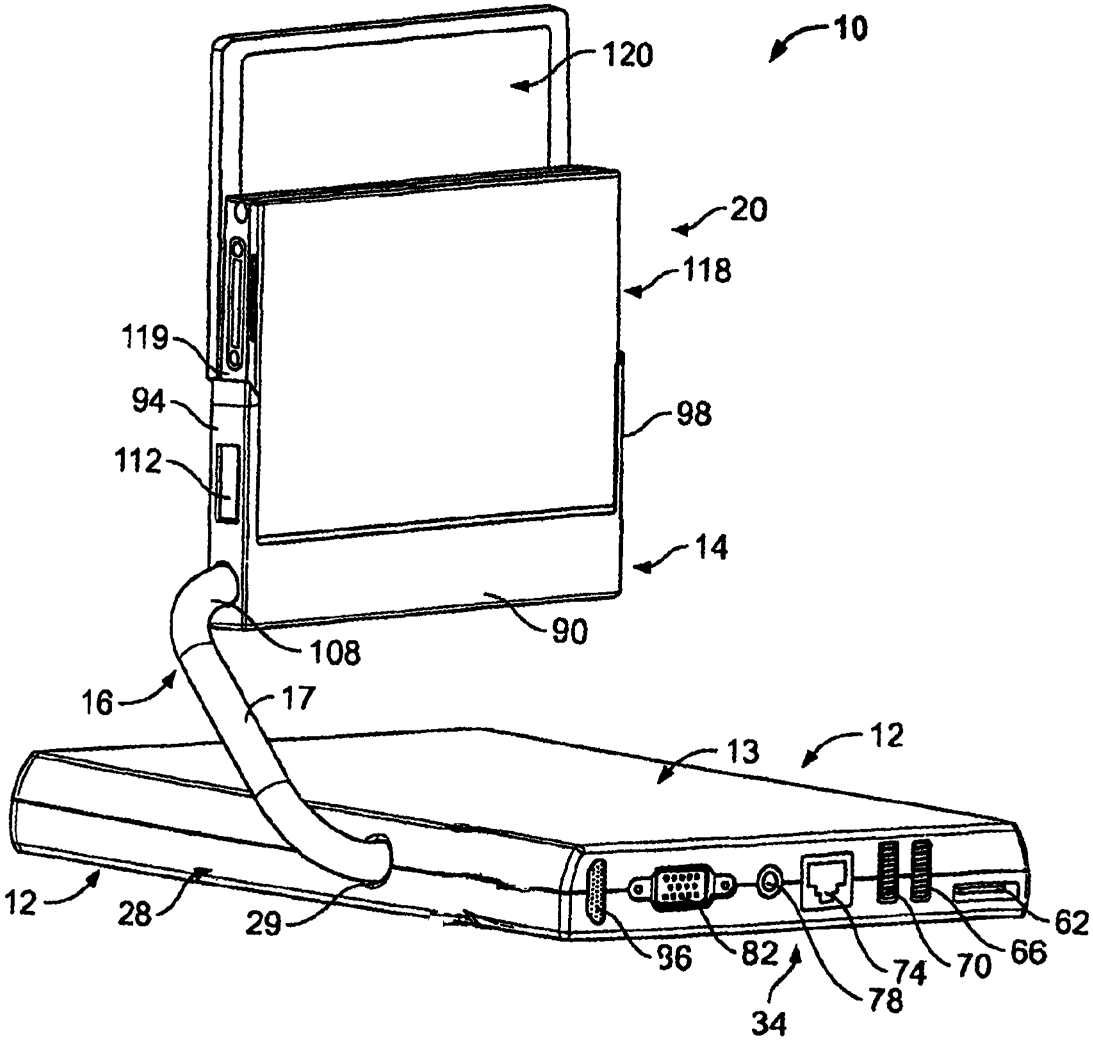
FIG. 10 is the perspective view of the embodiment of the docking assembly shown in FIG. 6 and engaged to a small handheld computer.

FIG. 10 is a perspective view of an embodiment of the docket assembly 10 including the docking station 12 with the computer support assembly 14 in a position for receiving and supporting a small handheld computer, generally illustrated as 20. As shown in FIG. 10, the side interface 34 comprises a power connector 62, a USB connection 66, a keyboard connector 70, Ethernet Port 74, a audio port connector 78, a UGA 82 and an IEEE HDMI 86. The arm-assembly side 28 is also illustrated. The top 13 and bottom 36 of the docking station 12 is illustrated, along with the arm assembly 16 having the arm 17 rotatably coupled to the docking station 12 and the computer support assembly 14 at locations 29 and 108, respectively. The computer support assembly 14 is shown in FIG. 10 as having the support member 90 with the pair of engagers 94 and 98 connected thereto in a generally opposed relationship. Engager 94 has opening 112.

The computer 20 shown in FIG. 10 includes a body 118, a display screen 120, and a top surface or keyboard (identified as "126" below). The display screen 120 is slidably coupled to the body 118 for sliding up and down for covering and uncovering the keyboard. The display screen 120 may be slidably adjusted as desired for convenient use. In an embodiment of the invention, when the computer 20 has been disposed in the desired position, the engagers 94 and 98 biasedly engage sides of the computer 20 for assisting in holding the computer 20 in a generally upright position. In an embodiment of the invention, each of the opposed engagers 94 and 98 may be formed with a pair of opposed lips to provide opposed slots such that sides of the computer 20 may slidably pass through and engage the opposed slots to also assist in generally holding the computer 20 in the generally upright position as shown in FIG. 10. In another embodiment of the invention, each of the inside surfaces of the opposed engagers 94 and 98 has a generally arcuate shape for conveniently engaging the edge surfaces of the computer 20.

The "computer 20" for purposes of embodiments of the present invention may be any device. By way of example only, the computer 20 may be a small handheld computer, such as those manufactured and distributed by OQO, Inc. In other embodiments the computer 20 may include different electronic devices, such as a personal digital assistant (PDA), cell phone, smartphone, electronic mail (email) device (e.g., Blackberry™ or similar), music or audio player, video device, gaming device or other small, compact or subcompact electronic device. By further way of example only, the "computer 20" is merely representative of many diverse products which may be employed in various embodiments of the invention, including those which may be computer-based products, and so forth. As indicated, the computer 20 is removably disposed in the computer support assembly 14.

Figure 11:
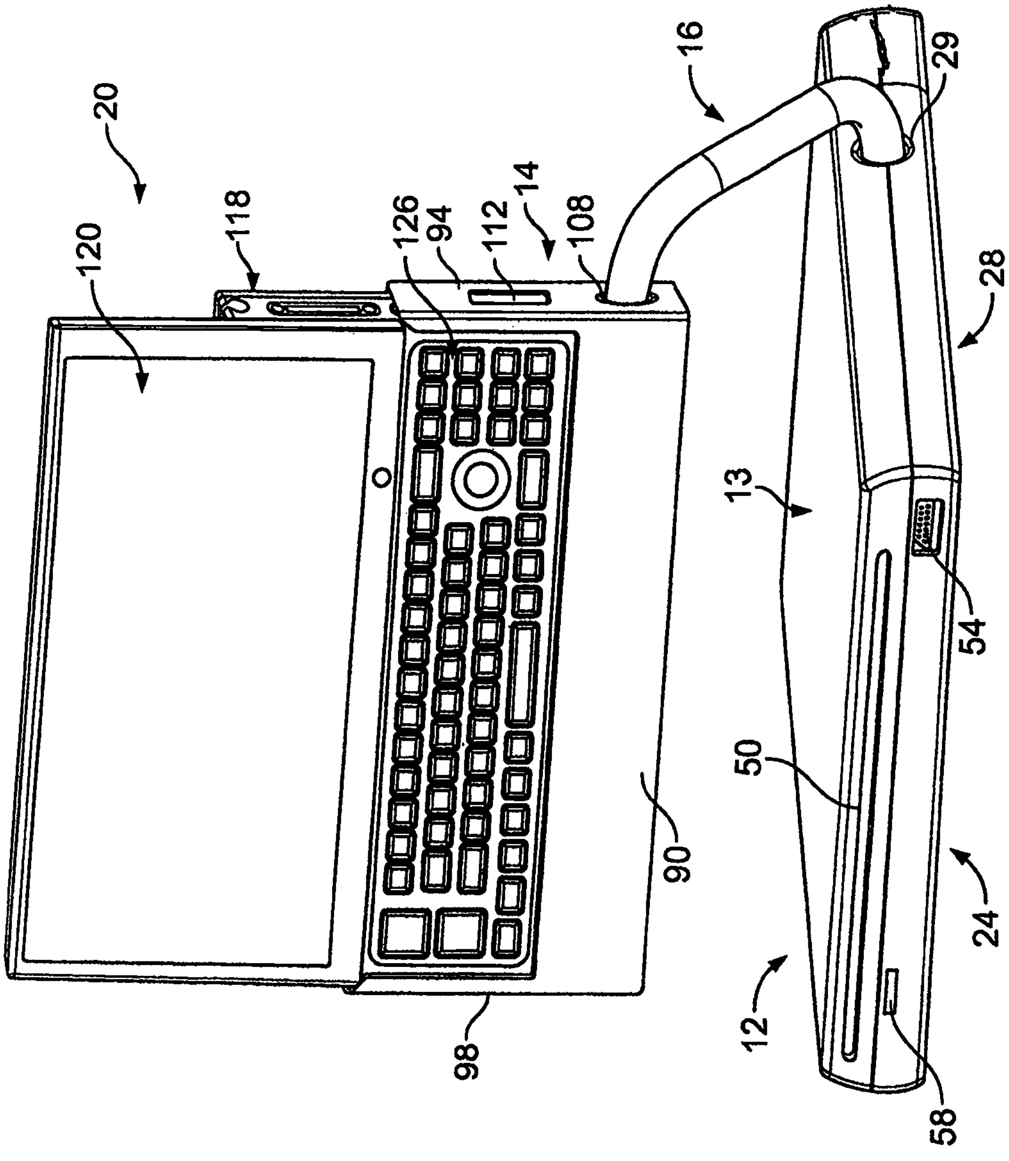
FIG. 11 is the perspective view of the embodiment of the docking assembly illustrated in FIG. 7 and engaged to a small handheld computer.

FIG. 11 is yet another perspective view of an embodiment of the docking assembly 10 including the docking station 12 and the computer support assembly 14 having been pivoted into a position for receiving and supporting a small handheld computer 20. The side interface 24 is illustrated as having the elect button 58, the CD/DVD slot 50, and USB port 54. The arm-assembly side 28 is also illustrated in FIG. 11. The top 13 of the docking station 12 is illustrated, along with the arm assembly 16 and its associated arm 17 rotatably coupled to the docking station 12 and the computer support assembly 14 at locations 29 and 108, respectively. The computer support assembly 14 is shown in FIG. 11 as including the support member 90 having the pair of engagers 94 and 98 connected or coupled thereto. The engagers 94 and 98 connect or couple to the support member 90 in a generally opposed relationship. Engager 94 has opening 112. The small handheld computer 20 in FIG. 11 is shown as having the body 118, the keyboard 126 and the slidable screen 120.

Figure 12:
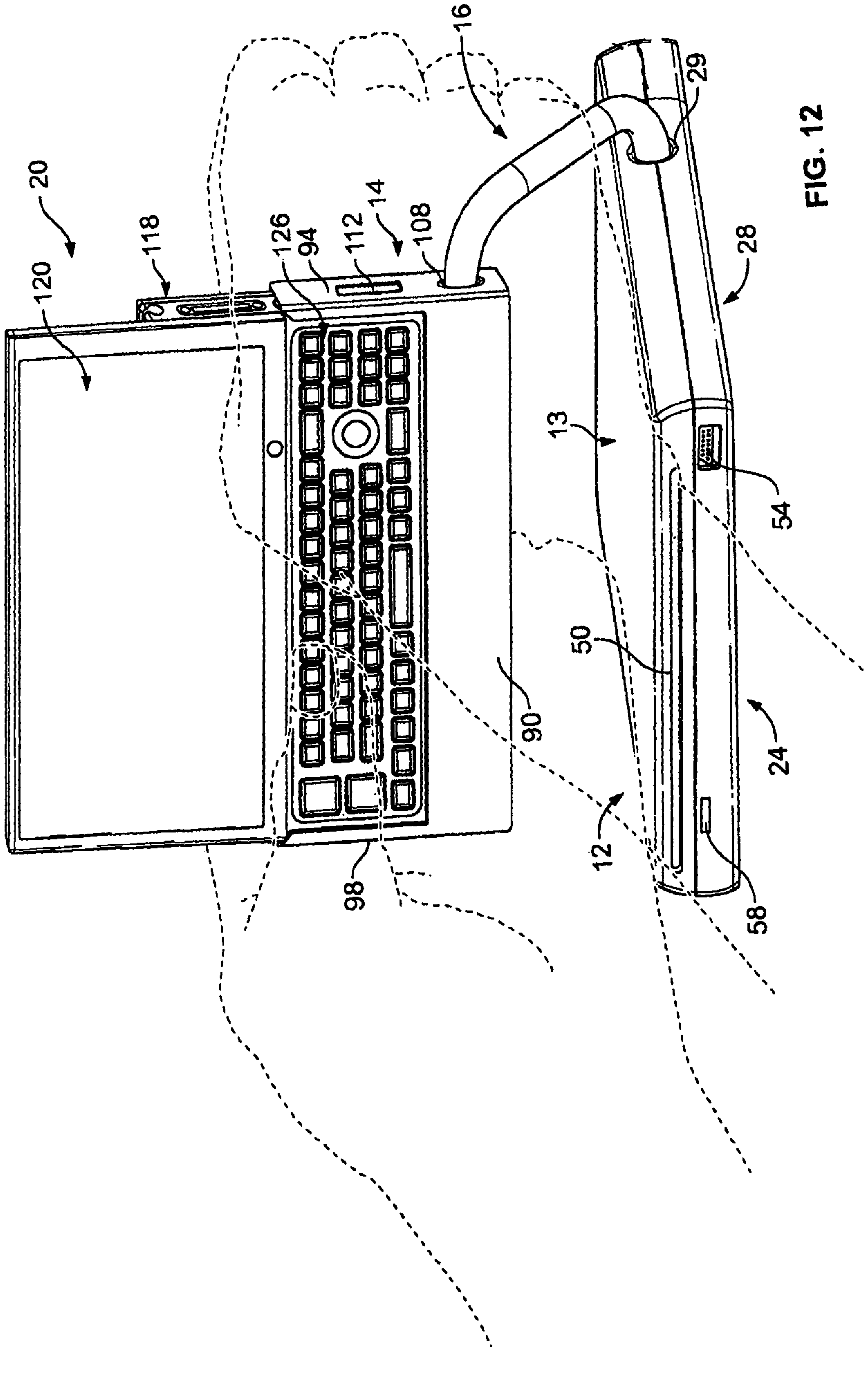
FIG. 12 is the embodiment of the docking assembly of FIG. 11 having the bottom or heels of a pair of hands resting on the docking station while the thumbs are engaging or contacting the keyboard of the portable computer.

FIG. 12 is the embodiment of the docking assembly 10 of FIG. 11 with at least one hand engaging or contacting a surface of the computer 20. As shown in FIG. 12, the bottom or heels of a pair of hands are resting on the docking station 12 while the thumbs are contacting or engaging the keyboard 126 of the portable computer 20. The small handheld computer 20 in FIG. 12 is shown as being supported by the computer support assembly 14 and having the body 118, the keyboard 126 and the slidable screen 120. The side interface 24 is illustrated in FIG. 12 as having the elect button 58, the CD/DVD slot 50, and USB port 54. The arm-assembly side 28 is also illustrated in FIG. 12. The top 13 of the docking station 12 is shown, along with the arm assembly 16 and its associated arm 17 rotatably coupled to the docking station 12 and the computer support assembly 14 at locations 29 and 108, respectively. The computer support assembly 14 is shown in FIG. 12 as including the support member 90 having the pair of engagers 94 and 98 connected thereto. The engagers 94 and 98 connect to the support member 90 in a generally opposed relationship. Engager 94 has opening 112.

Figure 13A:
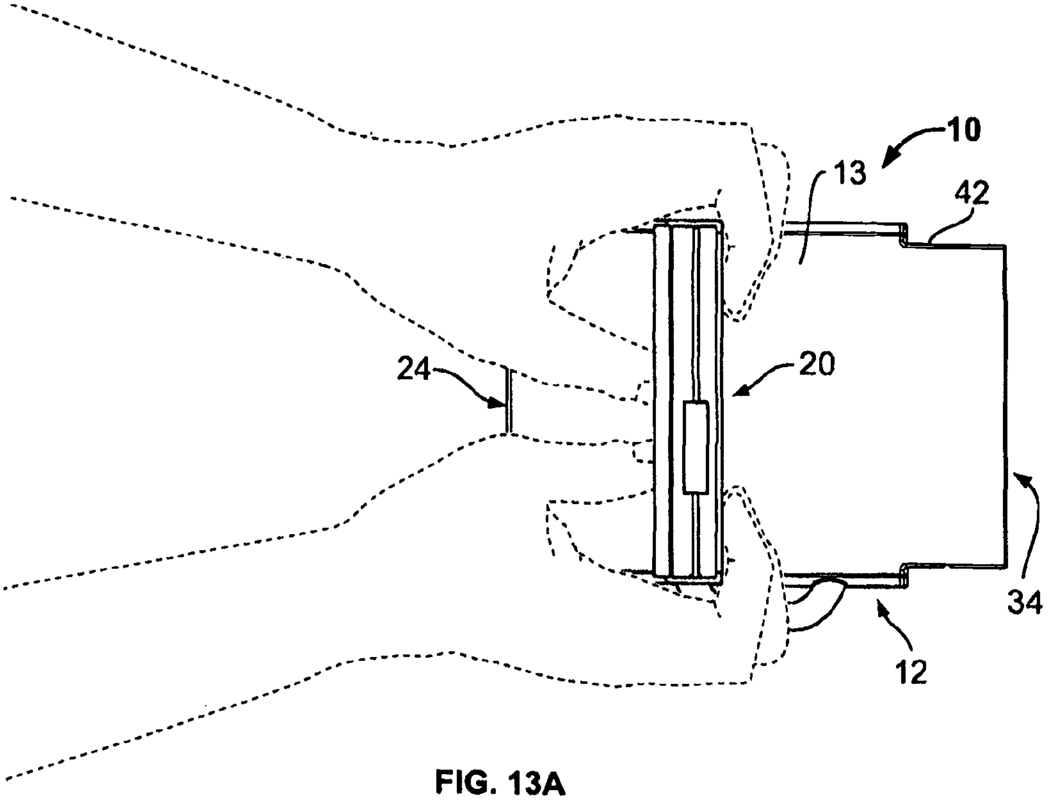
FIG. 13A is a top plan view of the embodiment of the invention illustrated in FIG. 12.

FIG. 13A is a top plan view of the embodiment of the invention illustrated in FIG. 12. FIG. 13A illustrates the thumbs of a pair of hands contacting and/or engaging the keyboard 126 of the portable computer 20 while the fingers of both hands are engaging and/or contacting the back of the portable computer 20, or contacting and/or engaging both the back of the portable computer 20 as well as the support member 90.

Figure 13B:
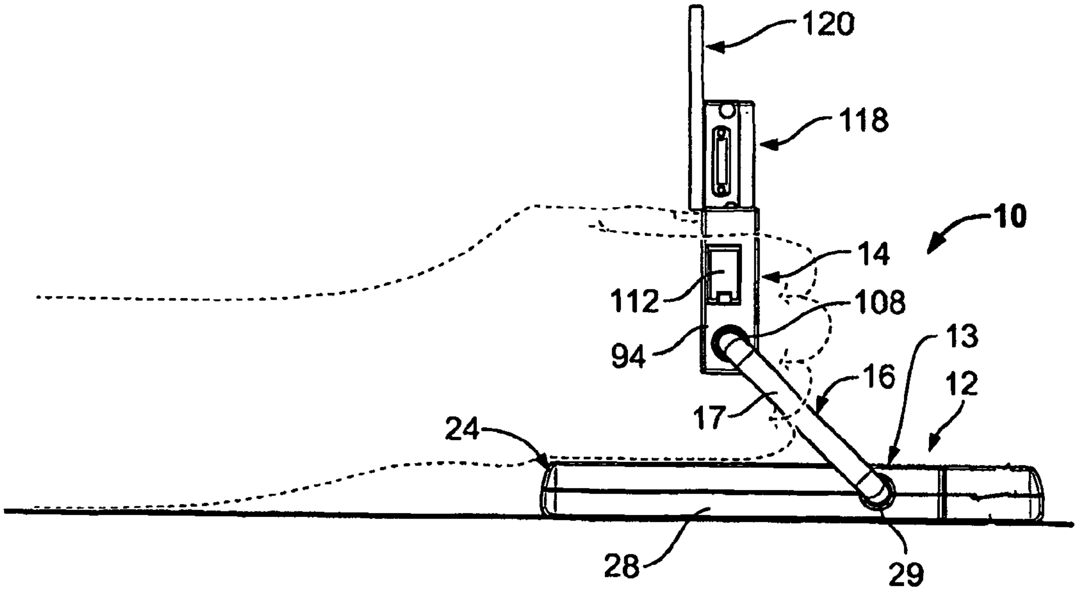
FIG. 13B is a side elevational view of the embodiment of the invention illustrated in FIG. 12.

FIG. 13B is a side elevational view of the embodiment of the invention illustrated in FIG. 12. There is seen in FIG. 13B the bottom or heels of a pair of hands resting on the docking station 12 while the thumbs of the pair of hands engage and/or contact the keyboard 126 of the portable computer 20, and while the fingers of both hands are engaging and/or contacting the back of the portable computer 20, or engaging and/or contacting both the back of the portable computer 20 as well as the support member 90. There is also seen in FIG. 13B the side interface 24 of the docking station 12, along with the arm assembly 16 and its associated arm 16 pivoting to the docking station 12 at location 29 which is located in side 28. A side elevational view of the computer support assembly 14 is shown as including the engager 94 having opening 112. The arm assembly 16 is shown as pivotally coupling to the computer support assembly 14 at location 108.

Continuing to refer to the drawings for operation of various embodiments of the invention, to release the computer support assembly 14 from the docking station 12, engagers 94 and 98 may be moved away from the docking (or base) station, or in another embodiment of the invention, engagers 94 and 98 are flexed outwardly in direction of arrows E and F, respectively (see FIG. 2). After the engagers 94 and 98 are moved (or flexed) away from the docking station 12, the computer support assembly 14 may be pulled and/or rotated upwardly for moving the computer support assembly 14 in a position for supporting the small handheld computer 20 when the latter engages multipurpose connector 102 and HDMI connector 106 (see FIGS. 10 and 11). The user may now operate or otherwise engage and/or contact the computer 20 after it is disposed in the computer support assembly 14. As is seen in FIGS. 12-13B, during operation of and/or engaging the computer 20, the bottom or heels of a pair of hands may rest on the docking station 12. Simultaneously with the thumbs of the pair of hands engaging and/or contacting the keyboard 126 of the portable computer 20, the fingers of both hands may engage and/or contact the back of the portable computer 20, or may engage and/or contact both the back of the portable computer 20 as well as the support member 90. Thus, an embodiment of the invention provides for user's hands to rest on the docking station 12, or on a surface (e.g., a desk or table) upon which the docking station 12 is resting, while the user is contacting at least one surface of the handheld computer 20. Further embodiments provide for thumbs of a user's hand to rest on the top surface (e.g., the keyboard 126) of the handheld computer 20 while the remaining fingers are wrapped around the back of the computer 20 for holding the same. The user's forearms may rest on a surface supporting the docking station 12, and the heels of the hands may rest on or adjacent to the top 13 of the docking station 12.

After a user has finished operating and/or engaging the computer 20, the computer 20 may be disengaged from the computer support assembly 14, and the computer support assembly 14 which may be subsequently re-coupled to the docking station 12 for disposing the computer support assembly 14 in the closed posture with respect to the docking station 12 (see FIGS. 1-3). To re-couple the computer support assembly 14 to the docking station 12, the computer 20 is slid upwardly to disengage the computer 20 from the computer support assembly 14 and the multipurpose connector 102 and HDMI connector 106. To assist in removing the computer 20 from the docking station 12, in one embodiment of the invention engagers 94 and 98 may be flexed outwardly in direction of arrows E and F, respectively (see FIG. 6 wherein arrows E and F are shown). After the computer 20 has been removed from the computer support assembly 14, the computer support assembly 14 and arm assembly 16 are moved towards interface 34 of the docking station 12, causing the computer support assembly 14 to move rotatably about the arm assembly 16 in direction of arrow A at location 108, and further causing the arm assembly 16 to move rotatably about the docking station 12 in direction of the arrow B at location 29, as best shown in FIG. 6.

As and/or when the base 90 of the computer support assembly 14 moves past the side interface 34 of the docking station 12, engagers 94 and 98 are moved or rotated toward sides 28 and 31, and/or may be flexed outwardly and away the sides 28 and 31. When the openings 112 and 116 associated with the engagers 94 and 98 are generally aligned respectively with sides 28 and 31, the engagers 94 and 98 are released for locking and/or engaging the computer support assembly 14 with the docketing station 12, as illustrated in FIGS. 1-3. When the computer support assembly 14 has been locked and/or engaged accordingly, the components (e.g., power connector 62, a USB connection 66, etc.) on the side interface 34, as well as the components (i.e., the multipurpose connector 102 and the HDMI connector 106) supported by the base 90, are protected from being damaged. Also, the arm assembly 16 provides a convenient handle for carrying the docking assembly 10.

In an embodiment of the invention, the engagers 94 and 98 may be furnished with sufficient elasticity such that after the engagers 94 and 98 are aligned with the sides 28 and 31, the biased or elasticity pressure of the engagers 94 and 98 against the sides 28 and 31 generally engage or steadfastly engage the sides 28 and 31 to lock or hold the computer support assembly 14 with the of the docking station 12.

In an embodiment of the invention, the top 13 and/or bottom 36 and/or any one of the four sides (e.g., 24, 28, 31 and 34) of the docking station 12 may include one or more keys, or one or more capacitive touch-sensors. The top 13 of the docking station 12 may include a key phone like keypad (e.g., a 12 key phone like keypad) or a qwerty style key board or a combination of both these input devices. The docking station arm element (the protective element 90) may have male versions of same ports as are on the back (i.e., side interface 34) of the docking station 12 in female form. Thus, when the arm 90 is in the protective mode, it may be pressed or slid toward the docking station 12 so that the ports fit into their compliments. This further compacts the device and adds addition protection to the sensitive connectors, especially the protruding male elements.

In further embodiments of the invention, engager 98 may engage and/or be released from the lock hole (e.g., lock hole 44). The top 13 of the base station may include one or more of a capacitive input device, a key, a set of keys, a keypad and a keyboard.

Reference throughout the specification to "one embodiment", "an embodiment", or "a specific embodiment" means that a particular feature, structure, or characteristic described in connection with the embodiment is included in at least one embodiment of the present invention and not necessarily in all its embodiments. Therefore, the respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention and are to be included within the spirit and scope of the present invention.

Therefore, while the present invention has been described herein with reference to the particular embodiments thereof, a latitude of modification, various changes and substitutions are intended in the foregoing disclosures, and it will be appreciated that in some instances some features of the embodiments of the invention will be employed without the corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for protecting an interface in a computer-docking assembly comprising:

rotating at least partially a computer-support assembly about an arm assembly while moving the computer-support assembly toward a first side of a base station and while the arm assembly is at least partially rotating about the base station; and aligning generally an interface of the computer-support assembly with the first side of the base station to engage the computer-support assembly with the base station for protecting the interface of the computer-support assembly to pivotally secure the computer-support assembly to the base station, wherein said aligning the interface of the computer-support assembly to engage the computer-support assembly with the base station comprises engaging the interface of the computer-support assembly with an interface of the base station.

2. The method claim 1, wherein said engaging the interface of the computer-support assembly to the interface of the base station comprises engaging a male component of the interface of the computer-support assembly to a corresponding female component of the interface of the base station.

3. A method for protecting an interface in a computer-docking assembly comprising:

rotating at least partially a computer-support assembly about an arm assembly while moving the computer-support assembly toward a first side of a base station and while the arm assembly is at least partially rotating about the base station; and aligning generally an interface of the computer-support assembly with the first side of the base station to engage the computer-support assembly with the base station for protecting the interface of the computer-support assembly by aligning a first surface of the computer-support assembly with a top surface of the base station and a second surface of the computer-support assembly with a bottom surface of the base station, to configure the computer-docking assembly into a closed position by forming a unitary assembly.

4. The method of claim 3, wherein the arm assembly protrudes from a second side of the base station to provide a handle for the computer-docking assembly when in the closed position.

5. The method of claim 4, wherein the second side of the computer-support assembly is adjacent to the top surface of the base station.

* * * * *